UNITED STATES PATENT OFFICE 2,681,897

SURFACE COATING COMPOSITIONS COMPRISING AMINOPLAST RESINS AND A THERMOPLASTIC COPOLYMER CONTAINING A POLYMERIZED HYDROXY ALKYL ESTER OF AN ALPHA, BETA ETHYLENICALLY UNSATURATED CARBOXYLIC ACID

Charles Frazier, Brooklyn, N. Y., and Leonard E. Cadwell, Stamford, Conn., assignors to American Cyanamid Company, New York, N. Y., a corporation of Maine No Drawing. Application October 6, 1950, Serial No. 188,866

20 Claims. (Cl. 260—45.2)

This invention relates to novel compositions of matter comprising a mixture of a thermosetting alkylated aminoplast resin and a thermoplastic copolymer of (1) an hydroxy alkyl ester of an alpha beta unsaturated carboxylic acid and (2) a compound containing a $CH_2=C<$ group and/or an alkyl ester of an alpha beta unsaturated carboxylic acid. This invention further relates to surface coating compositions comprising a mixture of a thermosetting alkylated aminoplast resin and a copolymer of an hydroxy alkyl ester of an alpha beta unsaturated carboxylic acid and a vinyl compound and/or an alkyl ester of an alpha beta unsaturated carboxylic acid in the presence of a compatible volatile organic solvent. Still further, this invention relates to surface coating compositions which, on baking, yield hard, insoluble, compatible films which are superior to the conventional alkyd amino resin films, not only in gloss and color but also in chemical and heat resistance. This invention further relates to novel compositions of matter which are particularly useful as vehicles in enamels, clear coatings, printing inks, floor coverings, in abrasive binders and the like and particularly for stove and refrigerator enamels. This invention further relates to surface coating compositions which comprise 5–40% by weight of a thermosetting alkylated aminoplast resin and 60—95% by weight of a thermoplastic copolymer of (1) an hydroxy alkyl ester of an alpha beta unsaturated carboxylic acid and (2) a compound containing a $CH_2=C<$ group and/or an alkyl ester of an alpha beta unsaturated carboxylic acid, in a compatible volatile organic solvent, wherein the ratio of the hydroxy ester to the vinyl compounds and/or alkyl esters, on a mol percent basis, is 5:95–50:50, respectively, wherein the hydroxy group of the hydroxy ester is a primary hydroxy group and the vinyl compound is devoid of any hydroxy group.

One of the objects of the present invention is to produce a composition of matter comprising a mixture of a thermosetting aminoplast resin and a copolymer of an hydroxy alkyl ester of an alpha beta acid and/or a compound containing a $CH_2=C<$ group. A further object of the present invention is to produce a surface coating composition comprising the composition broadly referred to hereinabove in a compatible volatile organic solvent. A further object of the present invention is to produce a surface coating composition comprising a combination of the copolymer and amino resins, as defined hereinabove, which, on baking, yield hard, insoluble, compatible films which are superior to the conventional alkyd amino resin films in gloss, color, heat and chemical resistance. These and other objects of the present invention will be discussed more fully hereinbelow.

One of the components of the composition of the present invention is the hydroxy alkyl esters of the alpha beta unsaturated carboxylic acid. The monomeric hydroxy esters are copolymerized with other vinyl compounds, such as the vinyl hydrocarbons and/or the alkyl esters of the unsaturated alpha beta acids. The hydroxy esters may be prepared in a number of different ways. For instance, one could prepare the monomeric ester by the slow dropwise addition of the chloride of the selected alpha beta unsaturated carboxylic acid, such as acrylic acid chloride, into an excess of a selected dihydroxy aliphatic alcohol, such as ethylene glycol. A still further method for the preparation of the monomeric esters can be accomplished by introducing the sodium salt of an alpha beta unsaturated carboxylic acid and an epihalohydrin into a suitable reaction chamber and by hydrolyzing the mixture, one could produce a good yield of the hydroxy alkyl ester of the alpha beta unsaturated carboxylic acid. There are a number of other ways in which these monomeric hydroxy esters may be prepared, but further discussion of them is deemed unnecessary. The scope of the invention is not limited to the monocarboxylic acid, as the di- and poly-carboxylic acids function equally as well. Amongst the monocarboxylic acids which may be used to prepare the monomeric hydroxy esters are such acids as acrylic, beta-benzoylacrylic, methacrylic, $\Delta'$-cyclohexene carboxylic, cinnamic, crotonic and the like. Amongst the alpha beta unsaturated polycarboxylic acids which may be used in the preparation of the monomeric hydroxy esters are maleic, fumaric, itaconic, citraconic, mesaconic, aconitic and the halogenated acids such as the halogenated maleic acid, chloromaleic acid and the like.

It has been indicated hereinabove that the hydroxy alkyl esters of the alpha beta unsaturated carboxylic acids must contain an hydroxy group which is a primary hydroxy group. It is, therefore, advisable to use, in the preparation of the hydroxy esters, such dihydric alcohols as ethylene glycol, propanediol - 1,3 butanediol - 1,4, pentanediol-1,5, hexanediol-1,6, heptanediol-1,7, octanediol-1,8, nonanediol-1,9 and decanediol-1,10 and the like.

Representative of the hydroxy alkyl esters of the alpha beta unsaturated carboxylic acids which may be used to form copolymers used in the practice of the present invention are 2-hydroxy ethyl acrylate, 3-hydroxy propyl acrylate, 4-hydroxy butyl acrylate, 5-hydroxy amyl acrylate, 6-hydroxy hexyl acrylate, 7-hydroxy heptyl acrylate, 8-hydroxy octyl acrylate, 9-hydroxy nonyl acrylate, 10-hydroxy decyl acrylate, 2-hydroxy ethyl methacrylate, 6-hydroxy hexyl methacrylate, 8-hydroxy octyl methacrylate, 10-hydroxy decyl methacrylate, 3-hydroxy propyl crotonate, 5-hydroxy amyl crotonate, 6-hydroxy hexyl crotonate, 7-hydroxy heptyl crotonate, 10-hydroxy decyl crotonate, di(2-hydroxy ethyl) maleate, di(4-hydroxy butyl) maleate, di(6-hydroxy hexyl) maleate, di(9-hydroxy nonyl) maleate, di(10-hydroxy decyl) maleate, di(2-hydroxy ethyl) fumarate, di(4-hydroxy butyl) fumarate, di(6-hydroxy hexyl) fumarate, di(10-hydroxy decyl) fumarate, and the like. Additionally, other substituents may be incorporated onto the alkyl chain, including secondary hydroxy groups, halide radicals, nitrile radicals and the like, such as 2,3-dihydroxy propyl acrylate, 3,5-dihydroxy amyl crotonate, 6,10-dihydroxy decyl methacrylate, di-2,6-dihydroxy hexyl maleate, di-2-chloro-7-hydroxy heptyl fumarate and the like. Obviously, mixtures of these esters may be used in the copolymer formation.

The hydroxy alkyl esters of the alpha beta unsaturated carboxylic acids may be copolymerized with a variety of vinyl compounds, such as the vinyl hydrocarbons and with the alkyl esters of the alpha beta unsaturated carboxylic acids; and, preferably, a mixture of a vinyl hydrocarbon and an alkyl ester of the alpha beta unsaturated carboxylic acid. Again, here, the carboxylic acid selected may be either a monocarboxylic or a polycarboxylic acid and included in the group of acids which may be used are those which have been set forth hereinabove in the discussion of the hydroxy esters. If one selects the alkyl esters of the alpha beta unsaturated carboxylic acids for copolymerization with the hydroxy alkyl esters of the alpha beta unsaturated carboxylic acids, one can use any monohydric aliphatic alcohol to co-react with the unsaturated acids. It is important that the alkyl group contain no hydroxy groups for copolymerization with the hydroxy esters. Amongst those alkyl esters of the alpha beta unsaturated carboxylic acids which may be used in the practice of the process of the present invention are methyl acrylate, ethyl acrylate, propyl acrylate, butyl acrylate, heptyl acrylate, decyl acrylate, methyl methacrylate, ethyl methacrylate, butyl methacrylate, amyl methacrylate, octyl methacrylate, methyl crotonate, ethyl crotonate, butyl crotonate, hexyl crotonate, octyl crotonate, dimethyl maleate, diethyl maleate, dibutyl maleate, diethyl fumarate, dibutyl fumarate, diheptyl fumarate, didecyl fumarate and the like.

In order to illustrate the reactive materials containing the $CH_2=C<$ group, the following are set forth as illustrative of the particular specific materials which may be used in the copolymerization with the hydroxy alkyl esters of the alpha beta unsaturated carboxylic acids: the hydrocarbons, such as styrene, o-, m-, or p-methyl styrene, alpha methyl styrene, 2,4-dimethyl styrene, 2,3-dimethyl styrene, 2,5-dimethyl styrene, vinyl naphthalene, acrylonitrile, methacrylonitrile, vinyl chloride and the like, the halo-substituted styrenes, such as alpha chlorostyrene, alpha beta dichloro vinyl benzene, alpha beta dibromo vinyl benzene, o-, m-, or p-chlorostyrene, 2,4-dichlorostyrene, 2,3-dichlorostyrene, 2,5-dichlorostyrene and the like.

In order to illustrate the process for the preparation of the copolymers to be used in the present invention, the following examples are set forth, in which all parts are parts by weight. It should be remembered that these examples are set forth solely for the purpose of illustration and should not be interpreted as limitations on the case, except as indicated in the appended claims.

Copolymer I 164.5 parts of beta hydroxy ethyl methacrylate, 231 parts of styrene, 104.5 parts of butyl methacrylate, 500 parts of amyl acetate and 5 parts of 2,2-bis(ditertiary butyl) peroxy butane are introduced into a suitable reaction chamber equipped with thermometer, stirrer and reflux condenser. The mixture is heated up to the reflux temperature while maintaining constant agitation and the reaction mixture is held at reflux temperature for approximately 5 hours. The charge is then cooled and removed from the reaction vessel and it is found that a 50% solids solution of the resin in solvent is approximately Z4–Z5 on the Gardner-Holdt scale at 25° C. and is water white.

Copolymer II 500 parts of amyl acetate are introduced into a suitable reaction chamber equipped as before and heated to the reflux temperature, whereupon a solution of 164.5 parts of beta hydroxy ethyl methacrylate, 231 parts of styrene, 104.5 parts of butyl methacrylate and 5 parts of 2,2-bis(ditertiary butyl) peroxy butane are introduced dropwise over a period of approximately 1.2 hours while maintaining the reaction mixture at reflux temperature. The heating at reflux is continued for an additional five hours. The resultant copolymer solution is water white and a 50% solids solution of the copolymer is approximately Z2 on the Gardner-Holdt scale at 25° C.

Copolymer III 500 parts of amyl acetate are introduced into a suitable reaction chamber as before and is heated to the reflux temperature. While maintaining the acetate at reflux, a solution of 148 parts of beta hydroxy ethyl methacrylate, 69 parts of styrene, 283 parts of butyl methacrylate and 5 parts of 2,2-bis(ditertiary butyl) peroxy butane are introduced dropwise over a period of 1.5 hours, while maintaining the charge in the reaction vessel at reflux, during the addition. The charge in the chamber is then maintained at reflux temperature for an additional five hours and the resultant copolymer solution, containing approximately 48% solids, has a viscosity of X on the Gardner-Holdt scale at 25° C. and is water white. The amount of conversion of the monomers to copolymer is 95.6%.

Copolymer IV 500 parts of amyl acetate are introduced into a suitable reaction chamber and brought to reflux temperature. While being maintained at that temperature, 56.5 parts of beta hydroxy ethyl methacrylate, 304 parts of styrene and 139 parts of butyl methacrylate, 5 parts of 2,2-bis(ditertiary butyl) peroxy butane are added dropwise in the same manner as that set forth for Copolymer III, while maintaining the temperature of the reaction mixture and solvent at the reflux temperature. When the addition of the monomer mixture had been completed, the system is continued at reflux for an additional five hours. The viscosity of a 48.6% solids solution of the copolymer in solvent was approximately U on the Gardner-Holdt scale at 25° C. and is water white. The conversion of the monomer mixture to the copolymer was approximately 97.6%.

*Copolymer V*

282 parts of beta hydroxy ethyl methacrylate, 726 parts of butyl methacrylate, 1010 parts of amyl acetate and 10 parts of 2,2-bis(ditertiary butyl) peroxy butane are introduced into a suitable reaction chamber equipped as before and the mixture is heated at reflux temperature for approximately five hours. A 45% solids solution of the copolymer has a viscosity of about V-Y on the Gardner-Holdt scale at 25° C. The amount of conversion of the monomers to the copolymer is 91.2%.

*Copolymer VI*

56 parts of beta hydroxy ethyl methacrylate, 22.4 parts of styrene, 21.6 parts of ethyl acrylate, 100 parts of Cellosolve acetate and 2 parts of cumene hydroperoxide are introduced into a suitable reaction chamber equipped with thermometer, stirrer and reflux condenser and the charge is heated to the reflux temperature and maintained at that level for approximately 5 hours. A 50% solids solution of the copolymer in solvent is approximately Z2-Z3 on the Gardner Holdt scale at 25° C. and the amount of conversion from monomers to copolymers is approximately 99.5%.

*Copolymer VII*

50 parts of bis(ethylene glycol) maleate, 50 parts of styrene, 100 parts of Cellosolve acetate and 2 parts of cumene hydroperoxide are introduced into a suitable reaction chamber equipped as before and the mixture is heated to reflux and maintained at that temperature for approximately five hours. The resultant copolymer solution had a viscosity of D on the Gardner-Holdt scale at 25° C.

In the preparation of the composition of the present invention, one may use any of the thermosetting alkylated aminoplast resins, such as the urea-aldehyde resins, the melamine aldehyde resins, the dicyandiamide-aldehyde resins and other aminoplast-aldehyde resins such as those triazine resins produced by the reaction of an aldehyde with formoguanamine, ammeline, 2-chloro-4,6-diamino-1,3,5-triazine, 2 - phenyl - p-oxy-4,6-diamino-1,3,5-triazine, 6, - methyl - 2,4-diamino-1,3,5-triazine, 2,4,6 - trihydrazine-1,3,5-triazine, and 2,4,6 - triethyl - triamino-1,3,5-triazine. The mono-, di-, or triaralkyl or mono-, di-, or tri-aryl melamines, for instance, 2,4,6-triphenyltriamino-1,3,5-triazine and the like. As aldehydes used to react with the amino compound to form the resinous material, one may use such aldehydes as formaldehyde, acetaldehyde, crotonic aldehyde, acrolein, or compounds which engender aldehydes, such as hexamethyl-enetetramine, paraldehyde, paraformaldehyde, trioxy-methylene and the like. Still further, one may use aromatic or heterocyclic aldehydes such as benzaldehyde, furfural and the like.

Among the mono- and poly-hydric alcohols which may be used in the preparation of the alkylated aminoplast resins are methyl alcohol, ethyl alcohol, butyl alcohol, ethyl butanol, ethyl hexanol, lauryl alcohol, acetyl alcohol, stearyl alcohol and the like. Although any of the alkylated aminoplast resins may be used, it is preferred that the butylated aminoplast resins be used, because of their improved compatibility with the polymers and copolymers of the present invention.

In order to illustrate the preparation of several of the aminoplast-type resins, the following examples are set forth, in which all parts are parts by weight.

*Resin A*

126 parts of melamine and 405.5 parts of formalin (a 37% aqueous solution of formaldehyde) and 440 parts of n-butanol are introduced into a suitable reaction chamber equipped with thermometer, stirrer, reflux condenser and a suitable water trap through which the reflux condensate passes on its return to the reaction chamber and in which the essentially aqueous fraction of the condensate may be separated from the essentially non-aqueous fraction. Means are provided so that the former fraction may be drawn off if desirable. The reaction mixture is refluxed to a temperature of about 91–93° C. at atmospheric pressure for 6–8 hours. The water is removed by azeotropic distillation from the reaction mixture during the reflux operation. The vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% with a desired solvent or diluent, e. g., xylene.

*Resin B*

3370 parts of a 37% aqueous formaldehyde solution are charged into a suitable reaction chamber and neutralized to a pH of 8.6 with 20% sodium hydroxide and there is then added 6 parts of an 85% phosphoric acid solution. The mixture is heated to 70° C. and 1200 parts of urea are added over a one hour period. The mixture is then heated to 85° C. and held at that temperature for approximately one hour. 1340 parts of butanol are added and the mixture is heated to reflux and held at that temperature for approximately one hour. 1550 additional parts of butanol are added and the mixture distilled, while replacing distillate with a feed of dry butanol, until the batch temperature reaches about 112° C. The batch is then vacuum concentrated at 90° C. to approximately 65% resin solids. This solution is diluted with xylene and butanol to give a final composition of 20% xylene, 30% butanol and 50% resin solids.

*Resin C*

1554 parts of a 37% aqueous formaldehyde solution with a pH adjusted to about 8 with sodium hydroxide is introduced into a suitable reaction chamber. Thereafter, 654 parts of benzoguanamine, 3 parts of magnesium carbonate, 945 parts of n-butanol and 122 parts of benzene are introduced. The reaction is heated under reflux decantation until 700 parts of water are drawn off. 7 parts of phthalic acid are then added and the heating under decantation is continued until practically all of the water (1300 parts) has been removed. The reaction mass is then cooled to about 70–80° C. and then filtered. The yield is about 1950 parts of resin solution containing 61–63% solids.

In the preparation of the composition of the present invention, it is desired to use between about 5–40% by weight of the thermosetting alkylated aminoplast resin and about 60–95% by weight of the thermoplastic copolymer as defined hereinabove. These percentages by weight are based on the total weight of the solids in the resinous composition. Actually, it is preferred to use about 10–30% by weight of the thermosetting aminoplast resin to about 70–90% by weight of the thermoplastic copolymer.

In the preparation of the copolymer of (1) the hydroxy alkyl ester of the alpha beta unsaturated carboxylic acids and (2) the compound containing the $CH_2=C<$ group and/or an alkyl ester of an alpha beta unsaturated carboxylic acid, the ratio of the former to the latter may be varied over a range such that, on a mol percent basis, the ratio is 5:95–50:50, respectively. It is preferred, however, that the ratio of the hydroxy ester to the compound containing the $CH_2=C<$ group be within the range of 15:85–40:60, respectively, on a mol percent basis.

It is still further preferred that in the preparation of the copolymer, that there be used a mixture of vinyl compound, namely one containing the $CH_2=C<$ group and an alkyl ester of an alpha beta unsaturated carboxylic acid. These two unsaturated compounds, as classes, namely alkyl esters of the alpha beta unsaturated carboxylic acids and the vinyl compounds may, however, be used interchangeably in the copolymerization with hydroxy alkyl esters of the alpha beta unsaturated carboxylic acids. As far as the latter two materials are concerned, the range of proportions is virtually unlimited, as styrene, for instance, may be used to the exclusion of any alkyl ester and, reciprocally, the alkyl esters may be used to the exclusion of any of the vinyl compounds. In specific instances, however, very desirable results are obtained when specific alkyl esters of the acids are used in combination with specific vinyl hydrocarbons, such as when butyl methacrylate is used in combination with styrene. If one selects butyl methacrylate and styrene for use in copolymerization with the hydroxy esters, one could use 15–55 parts of the butyl methacrylate to about 5–70 parts of the styrene on a mol percent basis, based on the total mol weight of of the copolymer.

In the actual formulation of the surface coating composition, it is generally desired to incorporate into the mixture of the aminoplast resin and the copolymer a polymerization catalyst which will serve to cause a co-reaction between the aminoplast resin and the copolymer, during the curing of the resinous mixture, although it is not imperative that such a catalyst be used. Prior to the curing operation and in the absence of a curing catalyst, the two components of the composition will exist in a simple mechanical mixture. In the course of the curing operation, such as when the surface coating composition is baked, one will experience a co-reaction between the components in the composition. In the absence of a curing catalyst, one would be required to use higher temperatures in order to accomplish a cure. By means of a curing catalyst one could accomplish the cure even at room temperature and can cure the resinous mixture readily by use of the conventional baking temperatures. Amongst the curing catalysts that may be used to cure the composition of the present invention are any of the acid catalysts and, included in that group, are the organic and the inorganic acid catalysts. One may use, for instance, in catalytic amounts, sulfuric acid, hydrochloric acid and their acid salts, such as ammonium sulfate, ammonium chloride, or the organic acids, such as acetic acid, phthalic acid, benzoic acid, toluene sulphonic acid, naphthalene sulphonic acid and the like.

In the formulation of the composition of the present invention, it is generally desired to make use of a solvent which is best described as a volatile organic solvent. It is desired that the solvent will be compatible with the components of the composition. It is further preferred that the solvent be substantially inert to the reactable components of the composition. Amongst those solvents which may be used are the aromatic hydrocarbons, such as xylene, naphthalene, benzene, toluene and the like; aliphatic and aromatic esters, such as amyl acetate, butyl acetate, butyl propionate, dibutyl phthalate, diethyl phthalate and the like; aliphatic and aromatic ethers such as ethylene glycol, diethyl ether, ethyl phenyl ether, diphenyl ether, butyl benzyl ether and the like.

The compositions of the present invention may be formulated in the manner set forth hereinbelow.

*Example*

50 parts of Resin A (50% solids) and 150 parts of Copolymer VI (50% solids) are introduced into a blending chamber and are thoroughly mixed until a homogeneous mixture has been produced. The resultant solution is then diluted with a suitable solvent such as amyl acetate until the viscosity at 25° C. in a No. 4 Ford cup is 20–30 secs. The catalyst may then be added and the solution stirred to distribute the catalyst evenly therethrough.

If it is desired to prepare pigmented enamel, the process set forth above can be modified by adding the desired pigment during the blending step.

Comparable coating compositions may be prepared by using the Resins B or C with the Copolymers I, II, III, IV, V and VII.

We claim:

1. A composition of matter comprising a compatible mixture of 5–40% by weight of a thermosetting alcohol-modified aminoplast resin and 95–60% by weight of a thermoplastic copolymer of (1) an hydroxy alkyl ester of an alpha beta ethylenically unsaturated carboxylic acid and (2) a compound containing a $CH_2=C<$ group, wherein the ratio of (1):(2) on a mol percent basis is 5:95–50:50, respectively, wherein the hydroxy group of (1) is a part of a $—CH_2OH$ group and compound (2) is devoid of any hydroxy group wherein said aminoplast resin is the condensation product of an aldehyde and a compound selected from the group consisting of urea, melamine, dicyandiamide, formoguanamine, benzoguanamine, ammeline, 2-chloro-4,6-diamino-1,3,5-triazine, 2-phenyl-p-oxy-4,6-diamino-1,3,5-triazine, 6-methyl-2,4-diamino-1,3,5-triazine, 2,4,6-trihydrazine-1,3,5-triazine, 2,4,6-triethyl-triamino-1,3,5-triazine, and 2,4,6-triphenyl triamino-1,3,5-triazine.

2. A surface coating composition comprising a compatible mixture of 5–40% by weight of a thermosetting alcohol-modified aminoplast resin and 60–95% by weight of a thermoplastic copolymer of (1) an hydroxy alkyl ester of an alpha beta ethylenically unsaturated carboxylic acid and (2) a compound containing a $CH_2=C<$ group and a compatible volatile organic solvent, wherein the ratio of (1):(2) on a mol percent basis is 5:95–50:50, respectively, wherein the hydroxy group of (1) is a part of a —$CH_2OH$ group and compound (2) is devoid of any hydroxy group wherein said aminoplast resin is the condensation product of an aldehyde and a compound selected from the group consisting of urea, melamine, dicyandiamide, formoguanamine, benzoguanamine, ammeline, 2-chloro-4,6-diamino-1,3,5-triazine, 2 - phenyl-p-oxy-4,6-diamino-1,3,5-triazine, 6-methyl - 2,4 - diamino-1,3,5-triazine, 2,4,6-trihydrazine - 1,3,5 - triazine, 2,4,6-triethyl-triamino-1,3,5-triazine, and 2,4,6-triphenyl triamino-1,3,5-triazine.

3. A surface coating composition comprising a compatible mixture of 10–30% by weight of a thermosetting alcohol-modified aminoplast resin and 70–90% by weight of a thermoplastic copolymer of (1) an hydroxy alkyl ester of an alpha beta ethylenically unsaturated carboxylic acid and (2) a compound containing a $CH_2=C<$ group and a compatible volatile organic solvent, wherein the ratio of (1):(2) on a mol percent basis is 5:95–50:50, respectively, wherein the hydroxy group of (1) is a part of a —$CH_2OH$ group and compound (2) is devoid of any hydroxy group wherein said aminoplast resin is the condensation product of an aldehyde and a compound selected from the group consisting of urea, melamine, dicyandiamide, formoguanamine, benzoguanamine, ammeline, 2-chloro-4,6-diamino-1,3,5-triazine, 2 - phenyl-p-oxy-4,6-diamino-1,3,5-triazine, 6-methyl - 2,4 - diamino-1,3,5-triazine, 2,4,6-trihydrazine - 1,3,5 - triazine, 2,4,6-triethyl-triamino-1,3,5-triazine, and 2,4,6-triphenyl triamino-1,3,5-triazine.

4. A surface coating composition comprising a compatible mixture of 10–30/ by weight of a thermosetting alcohol-modified aminoplast resin and 70–90% by weight of a thermoplastic copolymer of (1) an hydroxy alkyl ester of an alpha beta ethylenically unsaturated carboxylic acid and (2) a compound containing a $CH_2=C<$ group and a compatible volatile organic solvent, wherein the ratio of (1):(2) on a mole percent basis is 15:85–40:60, respectively, wherein the hydroxy group of (1) is a part of a —$CH_2OH$ group and compound (2) is devoid of any hydroxy group wherein said aminoplast resin is the condensation product of an aldehyde and a compound selected from the group consisting of urea, melamine, dicyandiamide, formoguanamine, benzoguanamine, ammeline, 2-chloro-4,6-diamino-1,3,5-triazine, 2 - phenyl-p-oxy-4,6-diamino-1,3,5-triazine, 6-methyl - 2,4 - diamino-1,3,5-triazine, 2,4,6-trihydrazine - 1,3,5 - triazine, 2,4,6-triethyl-triamino-1,3,5-triazine, and 2,4,6-triphenyl triamino-1,3,5-triazine.

5. A surface coating composition comprising a compatible mixture of 5–40% by weight of a thermosetting alcohol-modified melamine-formaldehyde resin and 60–95% by weight of a thermoplastic copolymer of (1) an hydroxy alkyl ester of an alpha beta ethylenically unsaturated carboxylic acid and (2) a compound containing a $CH_2=C<$ group and a compatible volatile organic solvent, wherein the ratio of (1):(2) on a mol percent basis is 5:95–50:50, respectively, wherein the hydroxy group of (1) is a part of a —$CH_2OH$ group and the compound (2) is devoid of any hydroxy group.

6. A surface coating composition comprising a compatible mixture of 5–40% by weight of a thermosetting alcohol-modified urea-formaldehyde resin and 60–95% by weight of a thermoplastic copolymer of (1) an hydroxy alkyl ester of an alpha beta ethylenically unsaturated carboxylic acid and (2) a compound containing a $CH_2=C<$ group and a compatible volatile organic solvent, wherein the ratio of (1):(2) on a mol percent basis is 5:95–50:50, respectively, wherein the hydroxy group of (1) is a part of a —$CH_2OH$ group and the compound (2) is devoid of any hydroxy group.

7. A surface coating composition comprising a compatible mixture of 5–40% by weight of a thermosetting alcohol-modified benzoguanamine-formaldehyde resin and 60–95% by weight of a thermoplastic copolymer of (1) an hydroxy alkyl ester of an alpha beta ethylenically unsaturated carboxylic acid and (2) a compound containing a $CH_2=C<$ group and a compatible volatile organic solvent, wherein the ratio of (1):(2) on a mol percent basis is 5:95–50:50, respectively, wherein the hydroxy group of (1) is a part of a —$CH_2OH$ group and the compound (2) is devoid of any hydroxy group.

8. A surface coating composition comprising a compatible mixture of 5–40% by weight of a thermosetting alcohol-modified aminoplast resin and 60–95% by weight of a thermoplastic copolymer of (1) an hydroxy alkyl ester of an alpha beta ethylenically unsaturated carboxylic acid and (2) a mixture of an alkyl ester of an alpha beta ethylenically unsaturated carboxylic acid and a vinyl hydrocarbon in a compatible volatile organic solvent, wherein the ratio of (1):(2) on a mol percent basis is 5:95–50:50, respectively, wherein the hydroxy group of (1) is a part of a —$CH_2OH$ group and the compounds (2) are devoid of any hydroxy groups, wherein said aminoplast resin is the condensation product of an aldehyde and a compound selected from the group consisting of urea, melamine, dicyandiamide, formoguanamine, benzoguanamine, ammeline, 2-chloro-4,6-diamino-1,3,5-triazine, 2-phenyl-p-oxy-4,6-diamino-1,3,5-triazine, 6-methyl-2,4-diamino - 1,3,5 - triazine, 2,4,6 - trihydrazine-1,3,5-triazine, 2,4,6 - triethyl - triamino-1,3,5-triazine, and 2,4,6-triphenyl triamino-1,3,5-triazine.

9. A surface coating composition comprising a compatible mixture of 5–40% by weight of a thermosetting alcohol-modified aminoplast resin and 60–95% by weight of a thermoplastic copolymer of (1) beta hydroxy ethyl acrylate and (2) a mixture of butyl methacrylate and styrene in a compatible volatile organic solvent, wherein the ratio of (1):(2) on a mol percent basis is 5:95–50:50, respectively, wherein the hydroxy group of (1) is a part of a —$CH_2OH$ group and the compounds (2) are devoid of any hydroxy groups, wherein said aminoplast resin is the condensation product of an aldehyde and a compound selected from the group consisting of urea, melamine, dicyandiamide, formoguanamine, benzoguanamine, ammeline, 2 - chloro-4,6-diamino - 1,3,5 - triazine, 2 - phenyl-p-oxy-4,6-diamino-1,3,5-triazine, 6 - methyl - 2,4 - diamino-1,3,5-triazine, 2,4,6 - trihydrazine - 1,3,5-triazine, 2,4,6-triethyl-triamino-1,3,5-triazine, and 2,4,6-triphenyl triamino-1,3,5-triazine.

10. A surface coating composition comprising a compatible mixture of 5–40% by weight of a thermosetting alcohol-modified aminoplast resin and 60–95% by weight of a thermoplastic copolymer of (1) beta hydroxy ethyl acrylate and (2) a mixture of butyl acrylate and styrene in a compatible volatile organic solvent, wherein the ratio of (1):(2) on a mol percent basis is 5:95–50:50, respectively, wherein the hydroxy group of (1) is a part of a —CH₂OH group and the compounds (2) are devoid of any hydroxy groups, wherein said aminoplast resin is the condensation product of an aldehyde and a compound selected from the group consisting of urea, melamine, dicyandiamide, formoguanamine, benzoguanamine, ammeline, 2 - chloro-4,6-di-amino - 1,3,5 - triazine, 2 - phenyl-p-oxy-4,6-di-amino - 1,3,5 - triazine, 6 - methyl-2,4-diamino-1,3,5-triazine, 2,4,6 - trihydrazine-1,3,5-triazine, 2,4,6-triethyl-triamino-1,3,5-triazine, and 2,4,6-triphenyl triamino-1,3,5-triazine.

11. A surface coating composition comprising a compatible mixture of 10–30% by weight of a thermosetting alcohol-modified aminoplast resin and 70–90% by weight of a thermoplastic copolymer of (1) an hydroxy alkyl ester of an alpha beta ethylenically unsaturated carboxylic acid and (2) a mixture of an alkyl ester of an alpha beta ethylenically unsaturated carboxylic acid and a vinyl hydrocarbon in a compatible volatile organic solvent, wherein the ratio of (1):(2) on a mol percent basis is 5:95–50:50, respectively, wherein the hydroxy group of (1) is a part of a —CH₂OH group and the compounds (2) are devoid of any hydroxy groups, wherein said aminoplast resin is the condensation product of an aldehyde and a compound selected from the group consisting of urea, melamine, dicyandiamide, formoguanamine, benzoguanamine, ammeline, 2-chloro-4,6-diamino-1,3,5-triazine, 2-phenyl - p - oxy - 4,6 - diamino-1,3,5-triazine, 6-methyl-2,4-diamino - 1,3,5 - triazine, 2,4,6-trihydrazine-1,3,5-triazine, 2,4,6 - triethyl - triamino-1,3,5-triazine, and 2,4,6-triphenyl triamino-1,3,5-triazine.

12. A surface coating composition comprising a compatible mixture of 10–30% by weight of a thermosetting alcohol-modified aminoplast resin and 70–90% by weight of a thermoplastic copolymer of (1) beta hydroxy ethyl methacrylate and (2) a mixture of butyl methacrylate and styrene in a compatible volatile organic solvent, wherein the ratio of (1):(2) on a mol percent basis is 5:95–50:50, respectively, wherein said aminoplast resin is the condensation product of an aldehyde and a compound selected from the group consisting of urea, melamine, dicyandiamide, formoguanamine, benzoguanamine, ammeline, 2-chloro-4,6-diamino-1,3,5-triazine, 2-phenyl - p - oxy - 4,6 - diamino-1,3,5-triazine, 6-methyl - 2,4 - diamino-1,3,5-triazine, 2,4,6-trihydrazine-1,3,5-triazine, 2,4,6 - triethyl - triamino-1,3,5-triazine, and 2,4,6-triphenyl triamino-1,3,5-triazine.

13. A composition of matter comprising a compatible mixture of 10–30% by weight of a thermosetting alcohol-modified aminoplast resin and 70–90% by weight of a thermoplastic copolymer of (1) 2-hydroxy ethyl acrylate and (2) a mixture of butyl acrylate and styrene in a compatible volatile organic solvent, wherein the ratio of (1):(2) on a mol percent basis is 5:95–50:50, respectively, wherein said aminoplast resin is the condensation product of an aldehyde and a compound selected from the group consisting of urea, melamine, dicyandiamide, formoguanamine, benzoguanamine, ammeline, 2 - chloro-4,6-di-amino - 1,3,5 - triazine, 2 - phenyl-p-oxy-4,6-di-amino-1,3,5-triazine, 6 - methyl - 2,4 - diamino-1,3,5-triazine, 2,4,6 - trihydrazine-1,3,5-triazine, 2,4,6-triethyl-triamino-1,3,5-triazine, and 2,4,6-triphenyl triamino-1,3,5-triazine.

14. A surface coating composition comprising a compatible mixture of 5–40% by weight of a thermosetting alcohol-modified melamine-formaldehyde resin and 60–95% by weight of a thermoplastic copolymer of (1) an hydroxy alkyl ester of an alpha beta ethylenically unsaturated carboxylic acid and (2) a mixture of an alkyl ester of an alpha beta ethylenically unsaturated carboxylic acid and a vinyl hydrocarbon in a compatible volatile organic solvent, wherein the ratio of (1):(2) on a mol percent basis is 5:95–50:50, respectively, wherein the hydroxy group of (1) is a part of a —CH₂OH group and the compounds (2) are devoid of any hydroxy groups.

15. A surface coating composition comprising a compatible mixture of 5–40% by weight of a thermosetting alcohol-modified urea-formaldehyde resin and 60–95% by weight of a thermoplastic copolymer of (1) an hydroxy alkyl ester of an alpha beta ethylenically unsaturated carboxylic acid and (2) a mixture of an alkyl ester of an alpha beta ethylenically unsaturated carboxylic acid and a vinyl hydrocarbon in a compatible volatile organic solvent, wherein the ratio of (1):(2) on a mol percent basis is 5:95–50:50, respectively, wherein the hydroxy group of (1) is a part of a —CH₂OH group and the compounds (2) are devoid of any hydroxy groups.

16. A surface coating composition comprising a compatable mixture of 5–40% by weight of a thermosetting alcohol-modified benzoguanamine-formaldehyde resin and 60–95% by weight of a thermoplastic copolymer of (1) an hydroxy alkyl ester of an alpha beta ethylenically unsaturated carboxylic acid and (2) a mixture of an alkyl ester of an alpha beta ethylenically unsaturated carboxylic acid and a vinyl hydrocarbon in a compatible volatile organic solvent, wherein the ratio of (1):(2) on a mol percent basis is 5:95–50:50, respectively, wherein the hydroxy group of (1) is a part of a —CH₂OH group and the compounds (2) are devoid of any hydroxy groups.

17. A surface coating composition comprising a compatible mixture of 10–30% by weight of a thermosetting alcohol-modified melamine-formaldehyde resin and 70–90% by weight of a thermoplastic copolymer of (1) beta hydroxy ethyl methacrylate and (2) a mixture of butyl methacrylate and styrene in a compatible volatile organic solvent, wherein the ratio of (1):(2) on a mol percent basis is 5:95–50:50, respectively.

18. A surface coating composition comprising a compatible mixture of 10–30% by weight of a thermosetting alcohol-modified urea-formaldehyde resin and 70–90% by weight of a thermoplastic copolymer of (1) 2-hydroxy ethyl acrylate and (2) a mixture of butyl acrylate and styrene in a compatible volatile organic solvent, wherein the ratio of (1):(2) on a mol percent basis is 15:85–40:60, respectively.

19. A surface coating composition comprising a compatible mixture of 10–30% by weight of a thermosetting alcohol-modified melamine-formaldehyde resin and 70–90% by weight of a thermoplastic copolymer of (1) beta hydroxy ethyl acrylate and (2) a mixture of butyl methacrylate and styrene in a compatible volatile organic solvent wherein the ratio of (1):(2) on a mol percent basis is 15:85–40:60, respectively.

20. A surface coating composition comprising a compatible mixture of 5–40% by weight of a thermosetting alcohol-modified melamine-formaldehyde resin and 60–95% by weight of a thermoplastic copolymer of (1) bis (ethylene glycol) maleate and (2) styrene, wherein the ratio of (1):(2) on a mol percentage basis is 5:95–50:50, respectively.

References Cited in the file of this patent

UNITED STATES PATENTS

| Number | Name | Date |
|---|---|---|
| 2,373,135 | Maxwell | Apr. 10, 1945 |
| 2,403,465 | Pease | July 9, 1946 |
| 2,432,242 | Leekley | Dec. 9, 1947 |
| 2,484,487 | Caldwell | Oct. 11, 1949 |

FOREIGN PATENTS

| Number | Country | Date |
|---|---|---|
| 628,150 | Great Britain | Aug. 23, 1949 |